United States Patent
Hjelm et al.

(10) Patent No.: US 6,529,497 B1
(45) Date of Patent: Mar. 4, 2003

(54) CHANNEL ALLOCATION AND RELEASE FOR PACKET DATA SERVICES

(75) Inventors: Suzanne Hjelm, Linköping (SE); Kenneth Balck, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/397,863

(22) Filed: Sep. 17, 1999

Related U.S. Application Data (63) Continuation-in-part of application No. 09/069,939, filed on Apr. 30, 1998, now Pat. No. 5,978,368.

(51) Int. Cl.⁷ .................................................. H04J 3/06

(52) U.S. Cl. ........................ 370/347; 370/350; 370/352; 370/466; 455/450

(58) Field of Search .................................. 370/328, 329, 370/330, 336, 337, 338, 345, 347, 348, 350, 466, 503, 352; 455/450, 509, 451, 62, 517, 455

(56) References Cited

U.S. PATENT DOCUMENTS

| 5,297,146 A | 3/1994 | Ogawa ........................ 370/522 |
| 5,381,471 A | 1/1995 | Balakrishnan et al. ...... 379/269 |

(List continued on next page.)

FOREIGN PATENT DOCUMENTS

| EP | 0 521 610 A2 | 1/1993 |
| EP | 0 642 283 A2 | 3/1995 |
| WO | 88/08646 | 11/1988 |

(List continued on next page.)

OTHER PUBLICATIONS

"Base Station Controller System Overview", Course Material, Dec. 6, 1996, p. 1.

(List continued on next page.)

Primary Examiner—Alpus H. Hsu
Assistant Examiner—Afsar M. Qureshi
(74) Attorney, Agent, or Firm—Nixon & Vanderhye, P.C.

(57) ABSTRACT

A telecommunications system (18) comprises a control node (24) and a base station node (22). The control node (24) maintains a first list (42) of idle radio channels which is consulted in order to obtain channels for a first type of telecommunications service. A second list (56) of idle radio channels is maintained for a specialized telecommunications service, the idle radio channels of the second list being radio channels which are unallocated with respect to the specialized telecommunications service but yet activated (e.g., having an established transmission path and synchronization). The second list of idle radio channels is initially consulted in order to obtain channels for the specialized telecommunications service. If no channels are available for the specialized telecommunications service on the second list, idle channels from the first list are adapted and utilized for the specialized telecommunications service. The specialized telecommunications service preferably involves packet data transfer (e.g., GPRS). As one aspect of the invention, any potential capacity problem is addressed by providing timers for channels on the second list. There is one timer corresponding to each channel on the second list, which timer is started when there is no more traffic ongoing on that channel. The channel remains activated with respect to the specialized telecommunications service, which makes fast specialized service access possible for all such users in that cell. As long as the timer has not expired, the channel on the second list is available for specialized service traffic without any new activation. However, when the timer expires, the channel is released and put on the first list, where it is once again available for all traffic. The timer values can be dynamically, e.g., depending on processor load or traffic load at a cell.

27 Claims, 10 Drawing Sheets

U.S. PATENT DOCUMENTS

| | | | |
|---|---|---|---|
| 5,528,664 A | 6/1996 | Slekys et al. | 455/452 |
| 5,561,843 A | 10/1996 | Tsang et al. | 455/450 |
| 5,708,974 A * | 1/1998 | Smith | 455/62 |
| 5,710,973 A | 1/1998 | Yamada et al. | 370/337 |
| 5,729,534 A * | 3/1998 | Jokinen et al. | 370/280 |
| 5,745,853 A | 4/1998 | Hippeläinnen | 455/450 |

FOREIGN PATENT DOCUMENTS

| | | |
|---|---|---|
| WO | WO 96/29832 | 9/1996 |
| WO | 96/29832 | 9/1996 |

OTHER PUBLICATIONS

GSM Technical Specification 08.58 version 5.2.0, source ETSI TC–SMG, Jul. 1996, pp. 14–16 and 21.

Transcoder Pool Handling, 1/55 17–CRT 242 01 Uen, Rev. A., Function Specification, BSS R6.1, Oct. 31, 1996, pp. 1–6.

Channel Allocation, 2/155 17–ANT 240 07 Uen, Rev. A., Function Specification Bss R.7, Feb. 24, 1998, pp. 1–13.

* cited by examiner

CHANNEL ALLOCATION AND RELEASE FOR PACKET DATA SERVICES

This application is a continuation-in-part of U.S. patent application Ser. No. 09/069,939, filed Apr. 30, 1998, now U.S. Pat. No. 5,978,368, which is incorporated herein by reference in its entirety.

BACKGROUND

1. Field of the Invention

The present invention pertains to cellular telecommunications, and particularly to allocation and release of radio channels for data services.

2. Related Art and Other Considerations

In recent years cellular telephones have become increasingly popular. A cellular telephone is just one example of what is referred to in telephone parlance as a "mobile station" or "mobile terminal". Telecommunications services are provided between a cellular telecommunications network and a mobile station (e.g., cellular telephone) over an air interface, e.g., over radio frequencies. At any moment an active mobile station is communicating over the air interface with one or more base stations. The base stations are, in turn, managed by base station controllers (BSCs). The base station controllers are connected via control nodes to a core telecommunications network. Examples of control nodes include a mobile switching center (MSC) node for connecting to connection-oriented, circuit switched networks such as PSTN and/or ISDN, and a general packet radio service (GPRS) node for connecting to packet-switched networks such as Internet, for example.

A mobile station can take on various forms other than a cellular telephone, including a computer (e.g., a laptop computer) with mobile termination capabilities. In some forms, mobile stations are capable of engaging in differing types of services, or multimedia services. In other words, the mobile station can execute several differing types of programs (i.e., "applications") which interact with the user. Examples of these applications include Internet browsers and electronic mail programs. Several multimedia applications may reside in the same mobile station.

One type of standardized mobile telecommunications scheme, utilized, e.g., in Europe, is the Global System for Mobile communications (GSM). GSM includes standards which specify functions and interfaces for various types of services. A relatively recent data service available within the GSM system is General Packet Radio Service (GPRS). GPRS differs from existing data services in that GPRS is a packet switched service instead of a circuit switched data service. Whereas (in GSM) a circuit switched data user is connected continuously to the radio network during a data call (e.g., even when not transferring data), a GPRS user is connected to the radio network only when either (1) the mobile station desires to transmit or (2) the network has something to transmit to the mobile station. In other words, in GPRS the mobile station (e.g., a computer with mobile termination) is not connected to the network constantly while the computer is in use, but only during these two transmission events.

The GPRS service is provided to a connection over a GPRS packet data channel (PDCH). Before a GPRS packet data channel is reserved for a connection requesting such reservation, the GPRS packet data channel must first be allocated to GPRS from a pool of channels also available to other data services and to speech services. A list of the available channels in such pool, known as the GSM Idle List, is maintained at the base station controller.

Allocation of a packet data channel involves not only performance of a GPRS channel allocation procedure at the base station controller (BSC), but also performance of a GPRS channel activation procedure (e.g., at the base station). Whereas the time required at the base station controller to allocate a packet data channel is rather short (on the order of one to two milliseconds), the time required for the GPRS channel activation procedure is considerably longer (e.g., approximately one hundred milliseconds).

The standards documents concerning the GSM are relatively silent regarding GSM channel allocation. Regarding channel activation, the GSM standards documents describe that a channel is chosen first by the base station controller and then GSM channel activation is performed. In this regard, see the GSM Technical Specification 08.58 Version 5.2.0, July 1996.

GSM prescribes a channel release procedure whereby the base station controller releases a radio channel which is no longer needed. In accordance with this GSM channel release procedure, the channel being released is returned to the GSM Idle List maintained by the base station controller. The base station controller also sends an RF CHANnel RELease message to the relevant transmitter/receiver at the base station, specifying the channel-to-be-released. After having released the addressed sources, the base station sends a RF CHANnel RELease ACKnowledge message to the base station controller.

In view of the characteristics of GPRS as above described, fast access to GPRS is imperative. The existing circuit switched scheme for accessing and releasing channels is not ideal for GPRS. In the existing circuit switched scheme, a channel is released when it is deallocated. But if a channel has to be allocated again subsequently, it must again undergo the time-intensive channel activation procedure.

What is needed therefore, and an object of the present invention, is a fast channel allocation and an appropriate release procedure, such as for GPRS, for example.

BRIEF SUMMARY OF THE INVENTION

A telecommunications system comprises a control node and a base station node. The control node maintains a first list (GSM Idle List) of idle radio channels which is consulted in order to obtain channels for a first type of telecommunications service. A second list (GPRS Idle List) of idle radio channels is maintained for a specialized telecommunications service, the idle radio channels of the second list being radio channels which are unallocated with respect to the specialized telecommunications service but yet activated (e.g., having an established transmission path and synchronization between the control node and a base station node). The second list of idle radio channels is initially consulted in order to obtain channels for the specialized telecommunications service. If no channels are available for the specialized telecommunications service on the second list, idle channels from the first list are adapted and utilized for the specialized telecommunications service. The specialized telecommunications service preferably involves packet data transfer (e.g., GPRS).

In one embodiment, the control node is a base station controller, and the second list is maintained at a packet control node. The packet control node can be co-located with the base station controller.

As one aspect of the invention, any potential capacity problem is addressed by providing timers for channels on the second list (GPRS Idle List). There is one timer corresponding to each channel on the second list, which timer is started when there is no more traffic ongoing on that channel. The channel remains activated with respect to the specialized telecommunications service, which makes fast specialized service access possible for all such users in that cell. As long as the timer has not expired, the channel on the second list is available for specialized service traffic without any new activation. However, when the timer expires, the channel is released and put on the first list, where it is once again available for all traffic. The timer values can be dynamically adjusted or varied, e.g., depending on processor load or traffic load at a cell.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
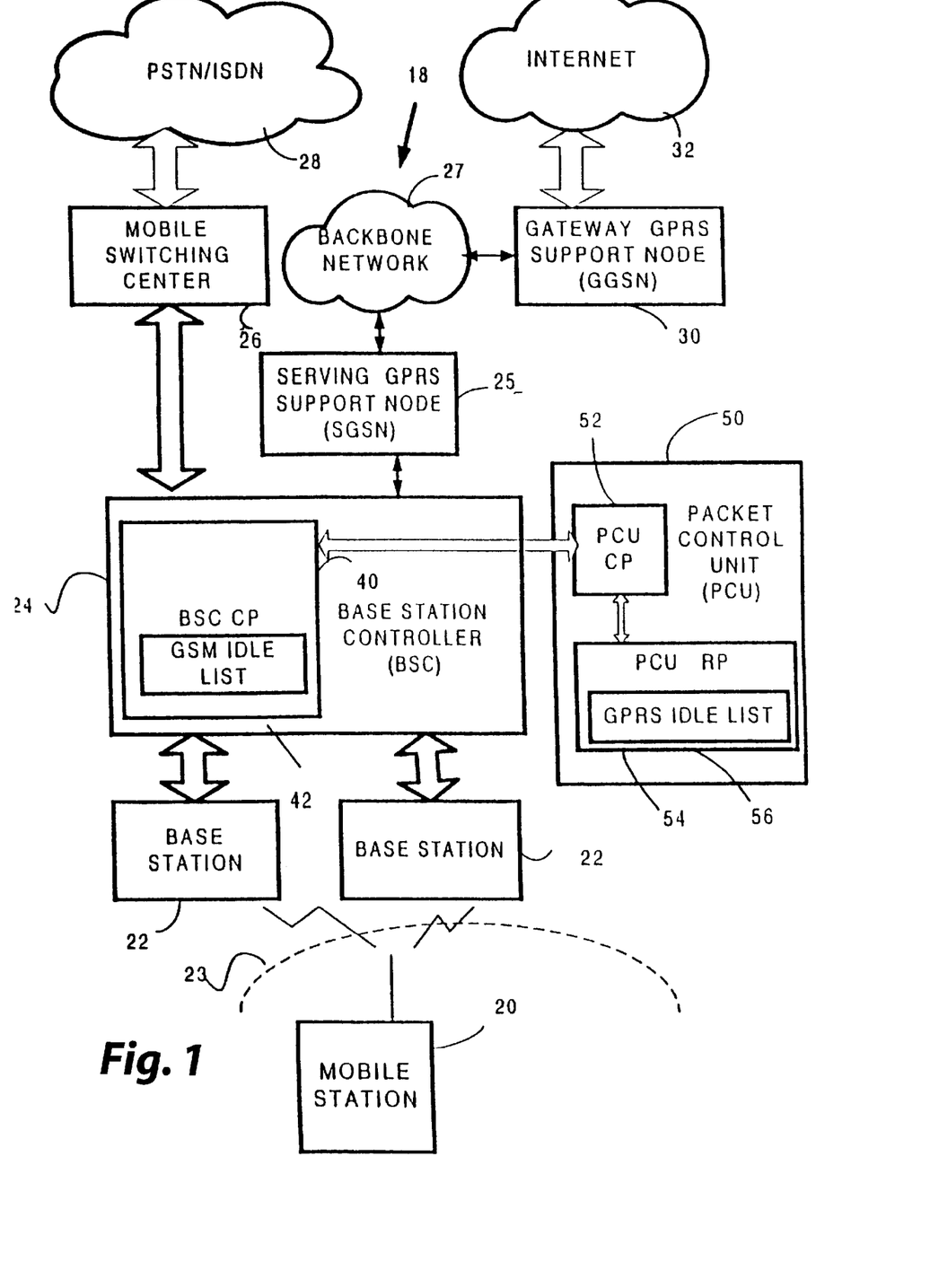
FIG. 1 is a diagrammatic view of a mobile telecommunications network which includes a channel allocation scheme according to a first embodiment of the invention.

FIG. 1 shows a telecommunications network 18 in which a mobile station 20 communicates with one or more base stations 22 over air interface (e.g., radio interface) 23. Base stations 22 are connected by terrestrial lines to base station controller (BSC) 24, also known as a radio network controller (RNC). Base station controller 24 is, in turn, connected through a control node known as the mobile switching center 26 to circuit-switched telephone networks represented by cloud 28. In addition, base station controller (BSC) 24 is connected to Serving GPRS Support Node (SGSN) 25 and through backbone network 27 to a Gateway GRPS support node (GGSN) 30, through which connection is made with packet-switched telephone networks (e.g., the Internet, X.25 external networks) represented by cloud 32.

Gateway GRPS support node (GGSN) 30 provides the interface towards the external IP packet networks and X.25 networks. Gateway GRPS support node (GGSN) 30 translates data formats, signalling protocols and address information in order to permit communication between the different networks. Backbone network 27 is an Internet Protocol (IP) network. Serving GPRS Support Node (SGSN) 25 provides packet routing to and from a SGSN service area, and serves GPRS subscribers which are physically located within the SGSN service area. Serving GPRS Support Node (SGSN) 25 provides functions such as authentication, ciphering, mobility management, charging data, and logical link management toward the mobile station. A GPRS subscriber may be served by any SGSN in the network depending on location. The GPRS traffic is routed from the Serving GPRS Support Node (SGSN) 25 to base station controller (BSC) 24 and via base station (BS) 22 to mobile station 20. The functionality of Serving GPRS Support Node (SGSN) 25 and Gateway GRPS support node (GGSN) 30 may be combined in the same node, or may exist in separate nodes as shown in FIG. 1.

As understood by those skilled in the art, when mobile station 20 is participating in a mobile telephonic connection, signaling information and frames of user information from mobile station 20 are transmitted over air interface 23 on designated radio channels to one or more of the base stations 22. The base stations have radio transceivers which transmit and receive radio signals involved in the connection. For information on the uplink from the mobile station 20 toward the other party involved in the connection, the base stations convert the radio-acquired information to digital signals which are forwarded to base station controller 24. Base station controller 24 orchestrates participation of the plural base stations 22 which may be involved in the connection, since mobile station 20 may be geographically moving and handover may be occurring relative to the base stations 22. On the uplink, base station controller 24 picks frames of user information from one or more base stations 22 to yield a connection between mobile station 20 and the other party, whether that party be in PSTN/IDSN 28 or on the Internet 32.

The base station controller (BSC) 24 of the present invention includes a BSC central processor (BSC CP) 40. The BSC central processor (BSC CP) 40 includes a GSM Idle List 42, which includes a list of channels which may be allocated for services generally regardless of nature. Further details of base station controller (BSC) 24 are below described in connection with FIG. 3.

The telecommunications network 18 of FIG. 1 also includes a packet control unit node, shown as packet control unit (PCU) 50. The packet control unit (PCU) 50 can be separately located relative to other nodes of telecommunications network 18, or can be co-located with another node. In the embodiment herein described in greater detail with respect to FIG. 3, packet control unit (PCU) 50 is co-located with base station controller (BSC) 24. The packet control unit (PCU) 50 includes e.g., a PCU central processor (CP) 52 and one or more regional processors, of which a PCU regional processor (RP) 54 is shown in FIG. 1. Of particular importance to the present invention is the fact that PCU regional processor (RP) 54 includes a GPRS Idle List 56. As explained in further detail below, GPRS Idle List 56 stores a listing of GPRS channels. While from the circuit switched point of view the channels listed on the GPRS Idle List 56 are allocated for GPRS, within GPRS such channels have not been reserved, but yet remain activated. Further details of packet control unit (PCU) 50 are below described in connection with FIG. 3.

Figure 3:
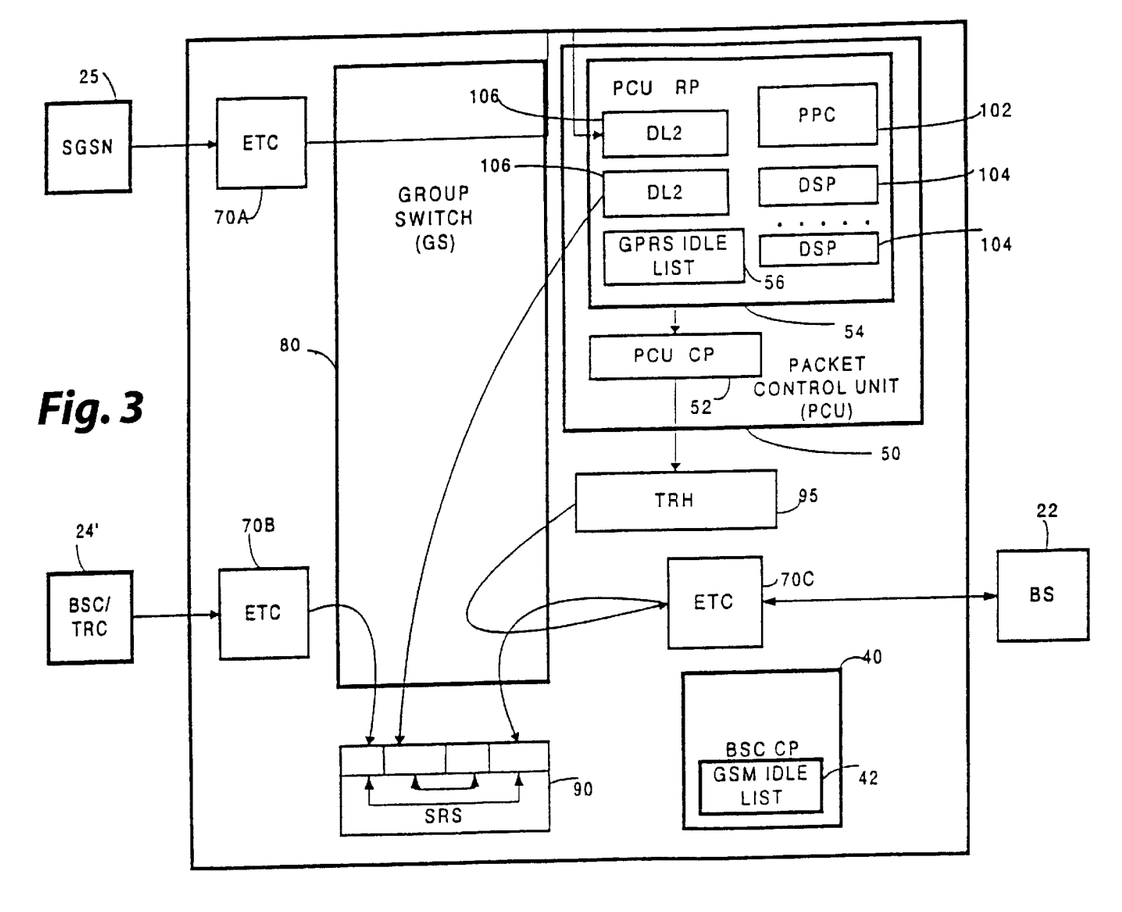
FIG. 3 is a schematic view of an example base station controller (BSC) included in the network of FIG. 1 and which operates in accordance with a mode of the present invention.

FIG. 3 shows a particular embodiment of base station controller (BSC) 24 which has co-located thereat the packet control unit (PCU) 50. As indicated above, packet control unit (PCU) 50 need not be situated at base station controller (B SC) 24, but can instead be situated at other nodes of telecommunications network 18 or even separately from any other node. FIG. 3 shows base station controller (BSC) 24 interfacing with SGSN 25, another base station controller (BSC) 24', and a base station (BS) 22. It should be understood that base station controller (BSC) 24 can be connected to plural base station controllers, and likely is connected to plural base stations (BS) 22 (although only singular examples are shown for clarity of illustration).

Generally, base station controller (BSC) 24 interfaces to other nodes of telecommunications network 18 in conventional fashion through exchange terminal circuits (ETCs), three such ETCs 70A–70C being shown in FIG. 3 for connecting to SGSN 25, base station controller (BSC) 24', and base station (BS) 22, respectively. In the illustrated embodiment, ETC 70A is connected to SGSN 25 by a Gb interface (n*64 kbps [n=1, . . . 31] wideband); ETC 70B is connected to base station controller BSC/TRC 24'; ETC 70C is connected to base station (BS) 22 by an Abis interface (16 kbps channels having multiplexed circuit switched and packet switched traffic). The TRC of node 24' contains both transcoders and rate adapters. The transcoders are used for speech and the rate adapters for circuit-switched data.

The heart of base station controller (BSC) 24 is a switch, such as group switch (GS) 80 shown in FIG. 3. Group switch (GS) 80 is under control of BSC central processor (BSC CP) 40. Group switch (GS) 80 has ports connected to each of the ETCs 70A–70C. In addition, group switch (GS) 80 has ports connected to a subrate switch (SRS) 90 and transceiver handler (TRH) 96, as well as to components of packet control unit (PCU) 50 as shown in FIG. 3. A TRH has functionality which handles the LAPD protocol (layer 2) towards Abis, i.e. the TRH handles signaling towards the BS over Abis.

The PCU regional processor (RP) 54 of packet control unit (PCU) 50 is shown in FIG. 3 as comprising a power PC 102; one or more digital signal processors 104; and plural connection units 106. As mentioned above, PCU regional processor (RP) 54 also includes GPRS Idle List 56. The PCU regional processor (RP) 54 is a regional processor with a PCI interface. The PCU regional processor (RP) 54 is configured to handle Gb, Abis, or both.

Each PCU regional processor RP (54) has two hundred fifty six 16-kbit/s devices known as GSL devices, i.e., multiprocess points toward group switch 80. In particular, each of the DL2s shown in FIG. 3 has one hundred twenty eight such devices. (The GSL devices are GPRS Signaling link devices. Thus, the number of GSL devices per regional processor (RP) 54 is restricted.

It is the allocation of channels, particularly GPRS channels, to which the present invention primarily relates. As used herein, "channel allocation" refers to a procedure of rendering channels available for use at a base station, whereas "channel reservation" refers to the scheduling and multiplexing of users onto one or more allocated channels. More particularly, the present invention relates to allocation of GPRS packet data channels (PDCHs). Allocation of a PDCH includes both selection of a suitable channel from a list of idle channels, as well as channel activation (e.g., preparation of a channel for packet data transfer, including establishment of transmission path and synchronizatioin between the control node and the base station node).

As used herein, "GPRS" is an example of a specialized telecommunications service for which the GPRS Idle List 56 is utilized. It should be understood, however, that the invention encompasses uses of plural lists (e.g., first list such as GSM Idle List 42 and second list such as GPRS Idle List 56) for differing services, and that the characterization of GPRS and non-GPRS services is provided as an example.

Figure 2:
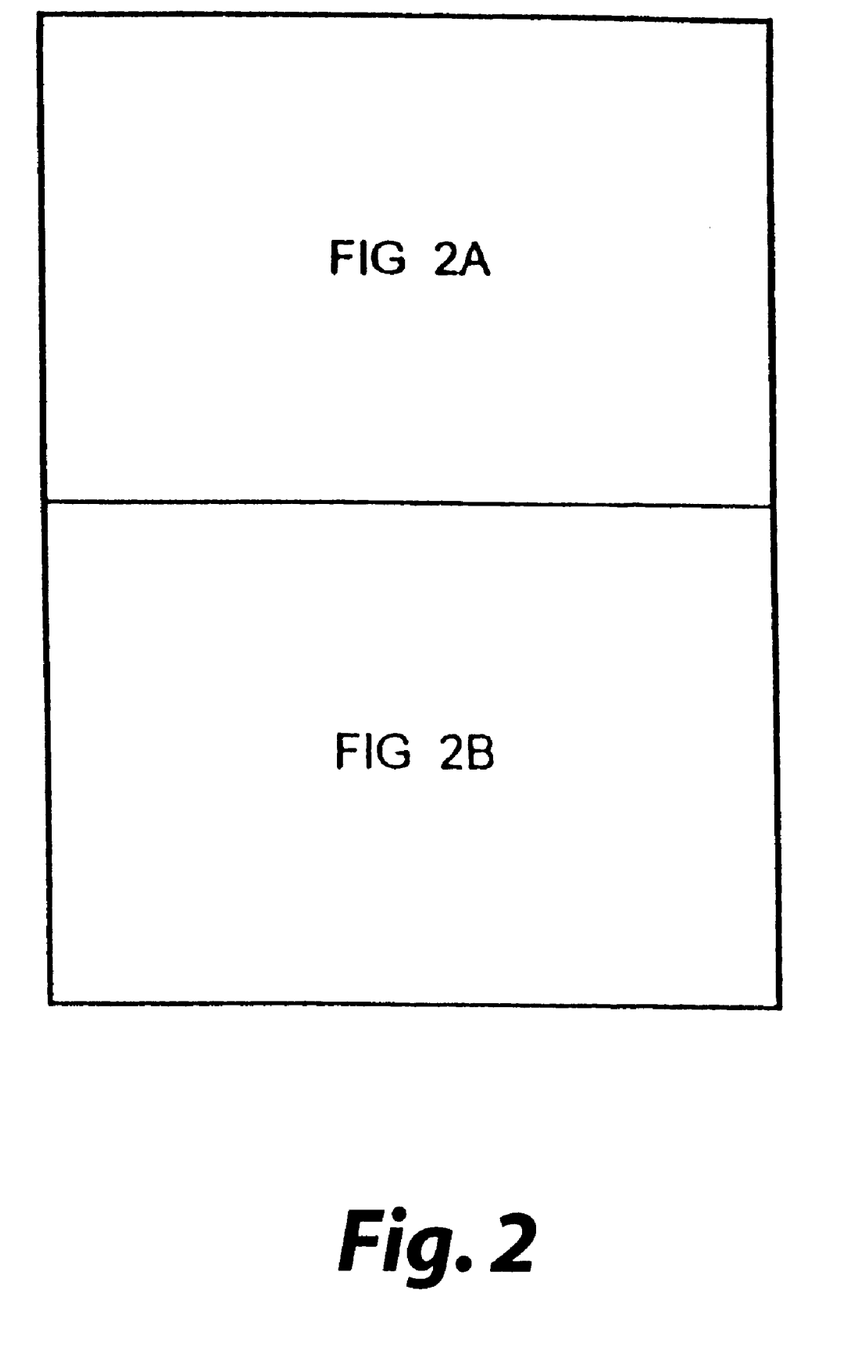
FIG. 2 is a schematic view showing a relationship between FIG. 2A and FIG. 2B.
Figure 2A:
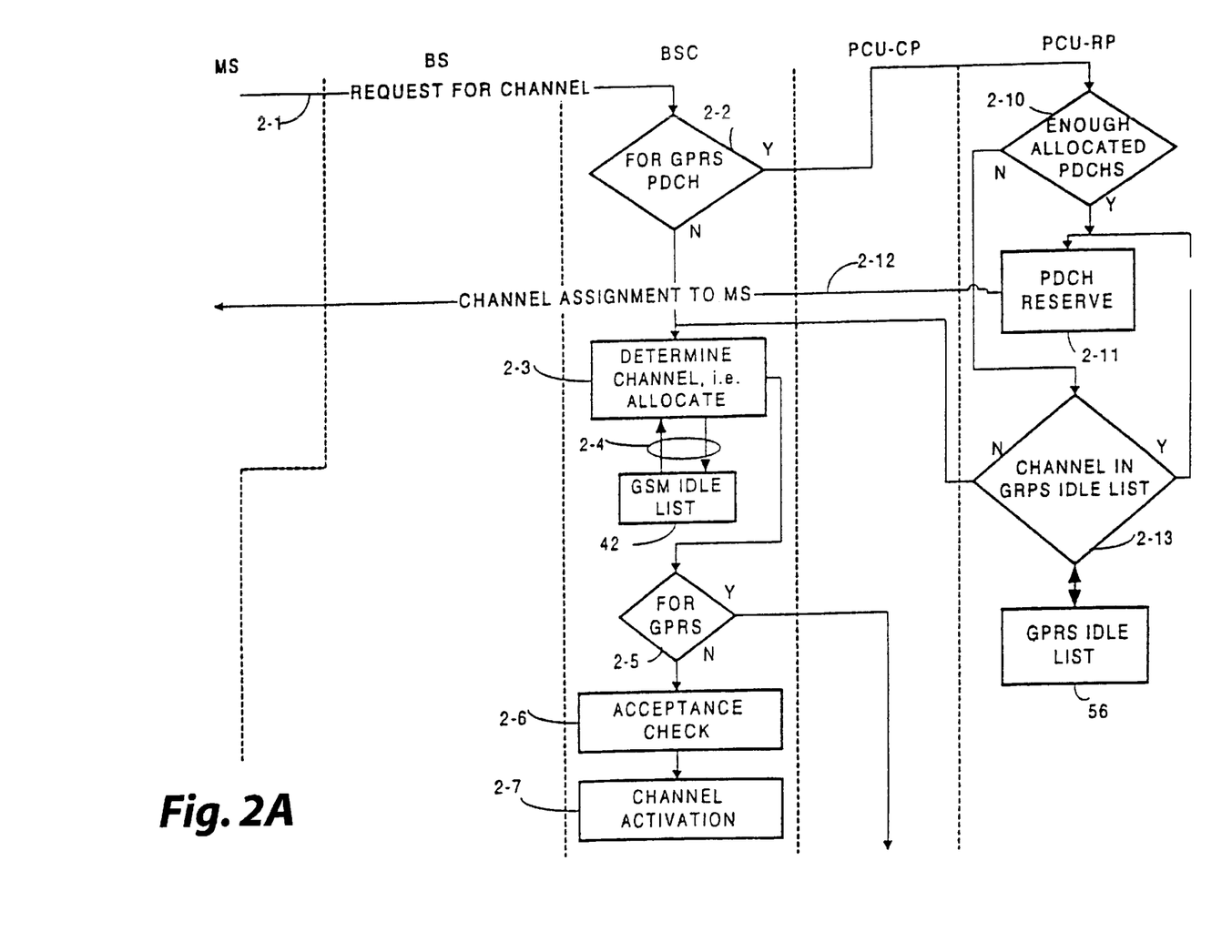
FIG. 2A and FIG. 2B are hybrid flowchart/schematic views of basic steps performed in accordance with a channel allocation procedure according to a mode of the invention.
Figure 2B:
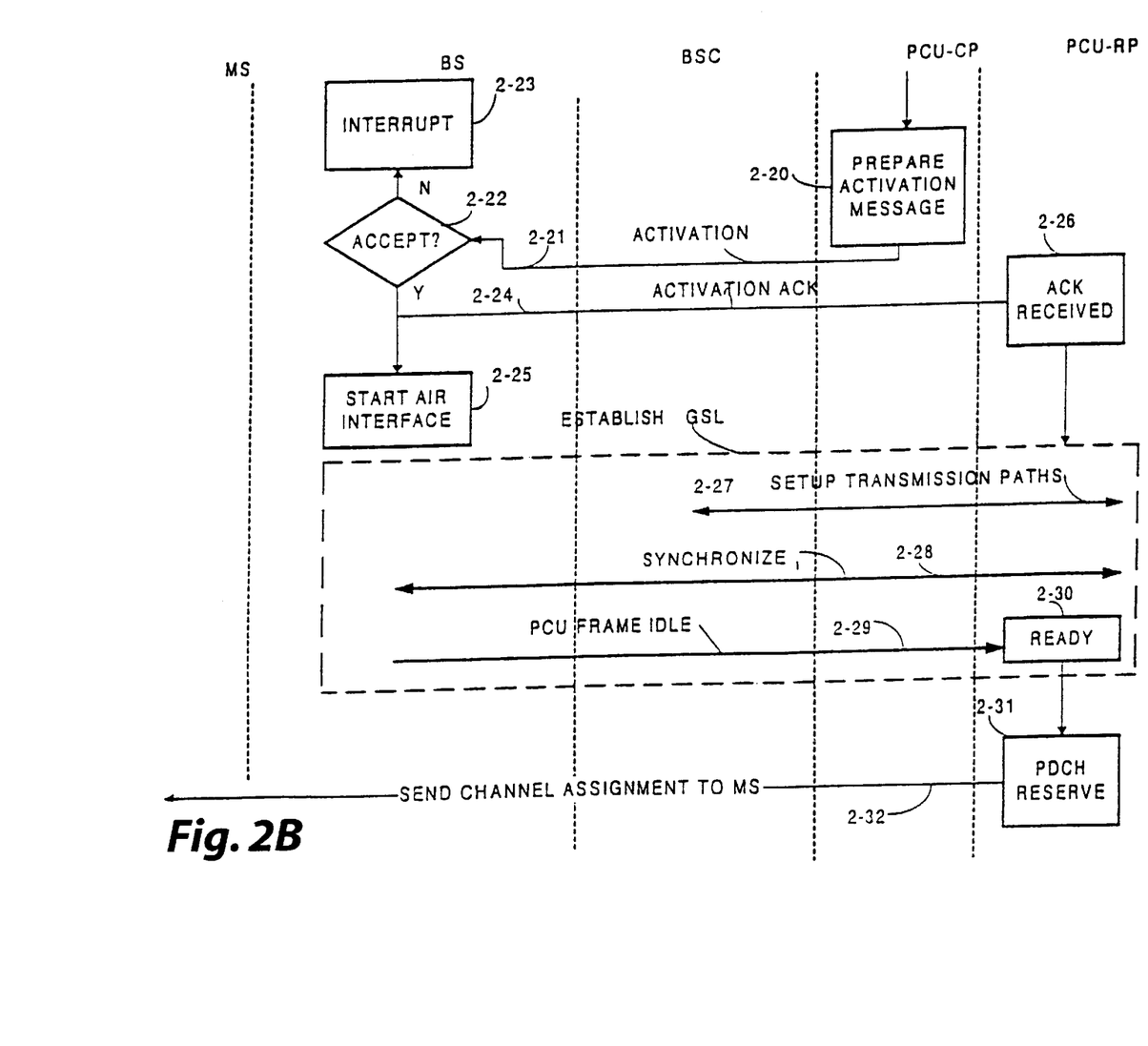

FIG. 2A and FIG. 2B illustrate operation of the present invention and exemplify use of GPRS Idle List 56. As shown by event 2-1 in FIG. 2A, mobile station 20 requests a channel. The channel request is forwarded by base station (BS) 22 to base station controller (BSC) 24. It should be understood, that unless otherwise stated or clear from the context, the events of FIG. 2A and FIG. 2B concerning base station controller (BSC) 24 are performed by BSC central processor (BSC CP) 40. At event 2-2, base station controller (BSC) 24 determines if the request of event 2-1 is for a GPRS channel.

The case of a non-GPRS channel request is first discussed, e.g., that of a request for a circuit switched channel. As indicated by event 2-3, base station controller (BSC) 24 allocates an idle channel for the request. The idle channel is obtained by consulting GSM Idle List 42 (as indicated by event 2-4 in FIG. 2A). Then, for a non-GPRS channel request (see event 2-5), base station controller (BSC) 24 performs an acceptance check (event 2-6) followed by channel activation (event 2-7). The GSM channel activation (event 2-7) involves various steps. Such steps include base station controller (BSC) 24 sending a channel activation message to the relevant transceiver of the appropriate base station (BS) 22. The channel activation message contains the reason for the activation (immediate assignment, assignment, handover, additional assignment), the identification of the channel to be used (channel number), and a complete description of the channel (full/half rate, speech/data, coding/rate adaptation, hopping sequence, encryption key, etc., for example). After activating the channel, the transceiver of the base station (BS) 22 responds with a CHANnel ACTIVation ACKnowledge message to base station controller (BSC) 24.

Next discussed is the case of a GPRS channel request. A PDCH allocation message is sent from BSC central processor (BSC CP) 40 through PCU central processor (PC) 52 and ultimately to PCU regional processor (RP) 54. As indicated by event 2-10, a check is made by PCU regional processor (RP) 54 of packet control unit (PCU) 50 whether there are already enough available allocated GPRS channels (PDCHs). That is, event 2-10 involves determining whether there is an available allocated, activated GPRS PDCH with existing reservation(s) or "fixed" PDCHs which can be utilized. It should be kept in mind in this regard that several users can share a GPRS PDCH. By "fixed PDCH" is meant a PDCH which can only be deallocated by an operator and which is ordered by an operator. If it is determined at event 2-10 that an allocated, activated GPRS PDCH is available, at event 2-11 such PDCH is reserved. Then, as indicated by event 2-12, a CHANNEL ASSIGNMENT TO MS message is sent to mobile station (MS) 20 via base station controller (BSC) 24 and base station (BS) 22.

If it is determined at event 2-10 that no allocated GPRS PDCH is available (or not enough PDCHs in the case of a mobile station MS requesting several PCDCHs), PCU regional processor (RP) 54 checks at event 2-13 whether an idle channel can be obtained from GPRS Idle List 56. The channels listed in GPRS Idle List 56 are idle in the sense that they are not yet allocated to a request for GPRS, although the channels in GPRS Idle List 56 remain activated. As seen hereinafter, by virtue of keeping the channels in GPRS Idle List 56 activated, the time-exact procedures of FIG. 2B need not be performed.

Should a channel be available on GPRS Idle List 56, PCU regional processor (RP) 54 reserves such channel (event 2-11). After the channel reservation of event 2-11, a CHANNEL ASSIGNMENT TO MS message is sent to mobile station (MS) 20 via base station controller (BSC) 24 and base station (BS) 22 in the manner illustrated and above described with respect to event 2-12.

Should no channel be available on GPRS Idle List 56, PCU regional processor (RP) 54 must request base station controller (BSC) 24 to determine an appropriate channel responsive to the request, as well as to allocate and activate such appropriate channel. In this regard, at event 2-3 the base station controller (BSC) 24 references GSM Idle List 42 (see event 2-4) to obtain therefrom an idle channel. Since the obtained idle channel is for GPRS (see event 2-5), the activation procedures of FIG. 2B are performed.

FIG. 2B shows PCU central processor (CP) 52, responsive to the determination of event 2-5, preparing (as event 2-20) an ACTIVATION message to activate the channel allocated at event 2-3. As shown by event 2-21, the ACTIVATION message is sent to base station (BS) 22. The base station (BS) 22 determines at event 2-22 whether to accept the ACTIVATION message. If the ACTIVATION message is not accepted, an interrupt is generated (event 2-23). If the ACTIVATION message is accepted, an ACTIVATION ACKnowledge message is returned to PCU regional processor (RP) 54 (event 2-24) and the air interface initiated (event 2-25). Initiating the air interface involves starting scheduling of the PDCH multiframe, no power being transmitted.

When PCU regional processor (RP) 54 determines at event 2-26 that ACTIVATION ACKnowledge message has been received, an ESTABLISH GSL procedure is performed to establish a link between the packet control unit (PCU) 50 and base station (BS) 22. This link is known as GSL or the GPRS signaling link. The ESTABLISH GSL procedure involves setting up transmission paths in the group switch (GS) 80 of base station controller (BSC) 24 (event 2-27); synchronization (event 2-28); and transmission of a PCU frame idle (event 2-29).

Transmission path set up (event 2-27) is the first action performed by procedure ESTABLISH GSL. The transmission path set up involves choosing a PCU device, belonging to packet control unit (PCU) 50, from a list, and choosing a PDCH. Then an order is given to group switch (GS) 80 of base station controller (BSC) 24 to connect the PCU device and the chosen PDCH. Then a connection is established between packet control unit (PCU) 50 and base station controller (BSC) 24 and synchronization (event 2-28) can be started.

In connection with synchronization (event 2-28), initially only a PCU Frame Sync is sent in both directions. An initial FN (frame number) synchronization between base station (BS) 22 and packet control unit (PCU) 50 is performed by sending the frame number from base station (BS) 22 to packet control unit (PCU) 50. When frame number synchronization is obtained between base station (BS) 22 and packet control unit (PCU) 50, base station (BS) 22 switches over to sending a PCU Frame Idle (event 2-29). Reception by packet control unit (PCU) 50 of the PCU Frame Idle is interpreted by PCU regional processor (RP) 54 as meaning that the GSL is ready to execute traffic (event 2-30).

After the channel allocated at event 2-3 has been activated in the manner above described with reference to FIG. 2B, PCU regional processor (RP) 54 reserves the channel (event 2-31). Then, as event 2-32, a CHANNEL ASSIGNMENT TO MS message is sent to mobile station (MS) 20 via base station controller (BSC) 24 and base station (BS) 22.

As long as the PDCH exists, an adaptive PCU frame alignment procedure runs autonomously. The adaptive PCU frame alignment procedure is used to minimize delay through base station (BS) 22. To achieve this, the alignment between radio blocks sent on the air interface and the PCU frames sent on GSL is continuously monitored and, if necessary, adjusted. The adaptive PCU frame alignment procedure has to be restarted if the PDCH is released.

Thus, as described above, when a request is issued for a GPRS channel, the GPRS Idle List 56 is consulted to determine if any available, unallocated GPRS PDCHs exist (event 2-13). If a channel is available as ascertained from GPRS Idle List 56, a reservation can be made essentially immediately (event 2-11). If a GPRS PDCH is not available from GPRS Idle List 56, a channel is fetched from GSM Idle List 42. However, if a channel is fetched from GSM Idle List 42, such channel has to be PDCH allocated, activated, and reserved (as described with reference to the events shown in FIG. 2B).

The GPRS Idle List 56 thus contains channels that, while allocated from the circuit switched perspective (e.g., no longer on GSM Idle List 42), are unallocated from the GPRS perspective. That is, while the channels on GPRS Idle List 56 are already activated, such channels have no reservations, i.e., no on-going traffic. In addition, it is possible that a fixed channel may not be put into GPRS Idle List 56 even if it has no traffic. Such a fixed channel can only be taken down by the operator, but once taken down such fixed channel is eligible for posting on GPRS Idle List 56.

With reference to the events shown in FIG. 2A, it may occur that no channels are available from GSM Idle List 42 when a request is made for a non-GPRS channel (e.g., for a circuit switched channel). In such case, in one embodiment of the invention base station controller (BSC) 24 is permitted to take a PDCH from the GPRS Idle List 56, or preempt a busy PDCH. To do so, the GPRS links (connections) must be taken down, and the channel activated as a circuit switched channel in accordance with conventional practice (e.g., as if it had come from GSM Idle List 42 rather than from GPRS Idle List 56).

Figure 4:
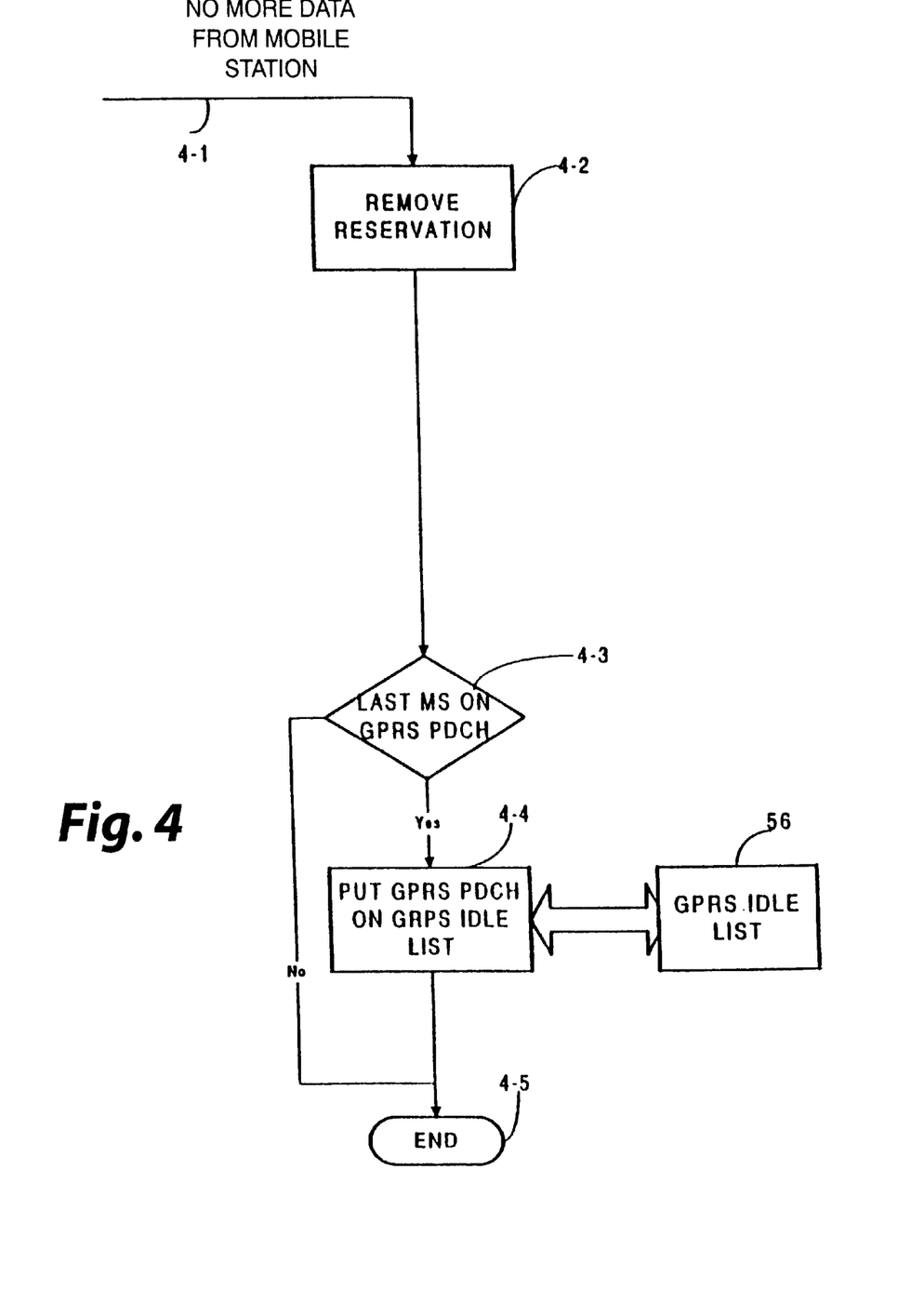
FIG. 4 is a flowchart showing basic steps performed in accordance with a procedure of putting channels on a GPRS Idle List according to a first mode of the invention.

FIG. 4 basically shows putting on a GPRS Idle list a GPRS PDCH when the mobile station MS previously using such PDCH has no more data presently to send. Event 4-1 shows mobile station informing PCU 50 that the mobile station MS has no more data to send. The message of event 4-1, received by base station controller (BSC) 24, is forwarded to PCU regional processor (RP) 54 of packet control unit (PCU) 50. As event 4-2, PCU regional processor (RP) 54 de-reserves (e.g., removes the reservation) for the GPRS PDCH by mobile station 20. Then, as event 4-3, the PCU regional processor (RP) 54 determines whether the mobile station which requested the release of the GPRS PDCH at event 4-1 was the last mobile station using that GPRS PDCH. If the determination at event 4-3 is affirmative, as event 4-4 the PCU regional processor (RP) 54 puts that particular GPRS PDCH on GPRS Idle List 56 before exiting the procedure (indicated by event 4-5).

Fixed channels allocated by the operator cannot be deallocated by means other than by the operator. Therefore, fixed channels are not added to GPRS Idle List 56 even if they have no traffic.

By putting GPRS PDCHs on GPRS Idle List 56 rather than deactivating them, packet control unit (PCU) 50 maintains a pool of ready-to-reserve PDCHs that would not have to be re-activated should they be needed again. Such is particularly advantageous and saves the activation procedures shown in FIG. 2B, including transmission path set up and synchronization, in a case in which a PDCH can be obtained from GPRS Idle List 56. This enables GPRS to efficiently allocate channels despite their bursty employment, thereby rendering GPRS competitive with circuit switched data services.

As described above, the packet control unit (PCU) 50 typically comprises a cluster of regional processors (RPs) 54. The number of packet data channels (PDCHs) that a regional processor (RP) 54 can handle is determined by the number of GSL (GPRS Signaling links) devices defined for the regional processor (RP) 54. One GSL device serves one PDCH. The number of GSL devices in the regional processor (RP) 54 determines how many PDCHs that can be handled by that regional processor (RP) 54, but the number of GSL devices in one regional processor (RP) 54 is lower than the number of cells that a regional processor (RP) 54 can serve.

In view of the foregoing, when GPRS Idle List 56 is used to obtain a fast GPRS access, some of the activated PDCHs (e.g., the PDCHs on GPRS Idle List 56) will not carry any traffic. Such a PDCH will nevertheless occupy one GSL device from the pool of GSL devices for the regional processor (RP) 54. If all GSL devices have been seized from the pool, no new PDCHs can be set up in any cell served by that regional processor (RP) 54, even if there is no circuit switched traffic presently occurring.

A second embodiment of the invention addresses this potential capacity problem, by providing timers for channels on the GPRS Idle List 56. As explained below, there is one timer corresponding to each PDCH on the GPRS Idle List 56. The timer is started when there is no more traffic ongoing on that channel (i.e., simultaneously with the channel being put on the GPRS Idle List 56). The channel remains GPRS activated, which makes a fast GPRS access possible for all GPRS users in that cell. As long as the timer has not expired, the channel on the GPRS Idle List 56 is available for GPRS traffic without any new activation. However, when the timer expires, the channel is released and put into the GSM Idle List, where it is once again available for all GSM traffic (both circuit switched [CS] and GPRS), although a new channel activation is needed when the channel is to be used again. The GSL device, used for the PDCH which has been released, is once again free to be used for any PDCH and cell. The timer values can be set either per packet control unit (PCU) 50 (if the PCU is integrated into the base station controller [BSC]), or per cell. The timer values can be set dyanamically.

Figure 1A:
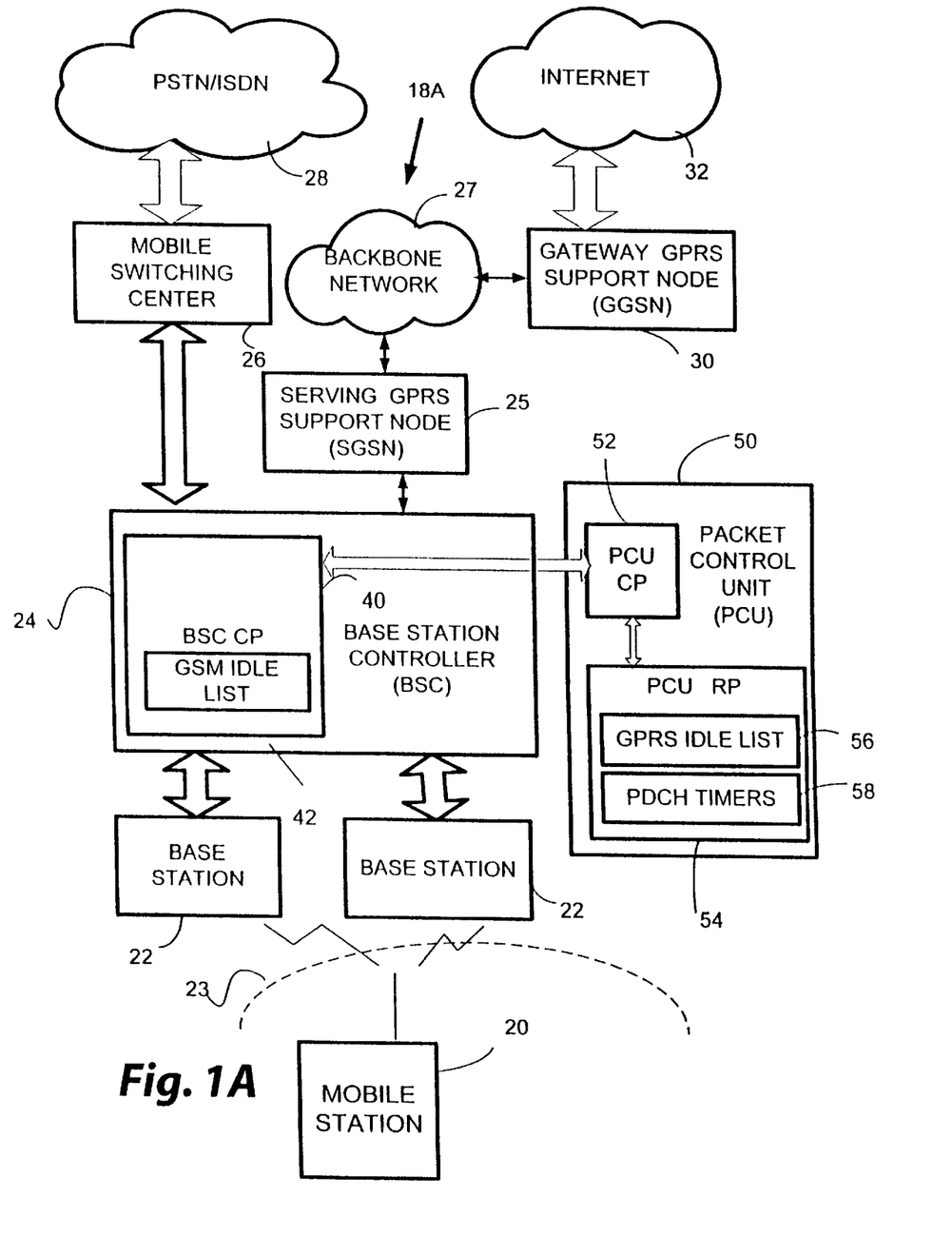
FIG. 1A is a diagrammatic view of a mobile telecommunications network which includes a channel allocation scheme according to a second embodiment of the invention.
Figure 3A:
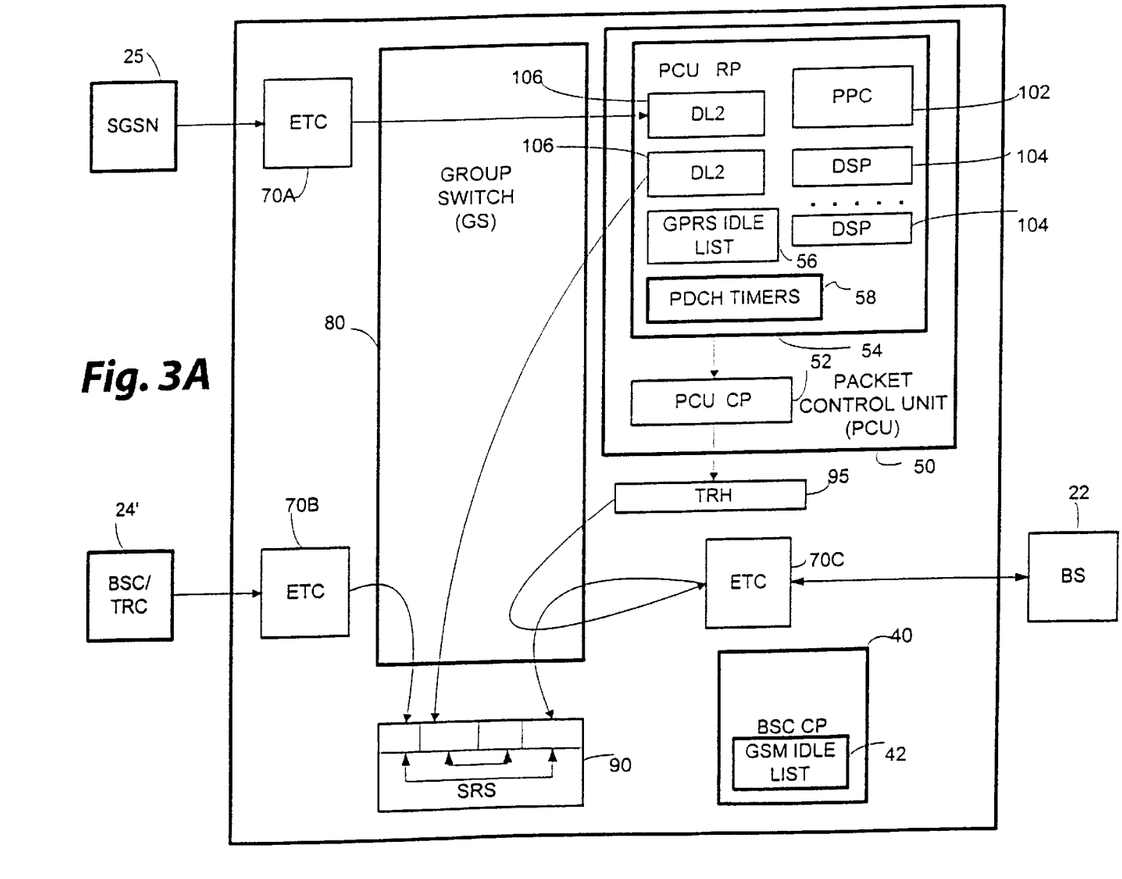
FIG. 3A is a schematic view of an example base station controller (BSC) included in the network of FIG. 1A and which operates in accordance with a second mode of the present invention.

FIG. 1A shows the second embodiment of a mobile telecommunications network 18A which includes a channel allocation scheme implementing the channel timers described above. FIG. 3A depicts an example base station controller (BSC) included in the network of FIG. 1A. Except as herein noted, the mobile telecommunications network 18A has the same constituency as the network 18 of FIG. 1, and the base station controller (BSC) of FIG. 3A resembles that of FIG. 3, for which reason like reference numerals are employed in FIG. 1A and FIG. 3A as in FIG. 1 and FIG. 3, respectively.

As shown in FIG. 1A and FIG. 3A, the packet control unit (PCU) 50 of mobile telecommunications network 18A has at least one (and preferably plural) regional processors (RP) 54. One or more of the regional processors (RPs) 54 has a GPRS Idle List 56. It may be the case that there is a GPRS Idle Line for each regional processor (RP) 54, but it is also possible that some regional processors (RPs) 54 have no GPRS Idle List. In addition, at least for those regional processors (RPs) 54 having a GPRS Idle List also have a bank of PDCH timers 58. The bank of PDCH timers 58 includes a timer for each data channel that has been allocated to GPRS. The employment of an example timer in the bank of PDCH timers 58 is illustrated in conjunction with FIG. 4A and FIG. 4B.

Figure 4A:
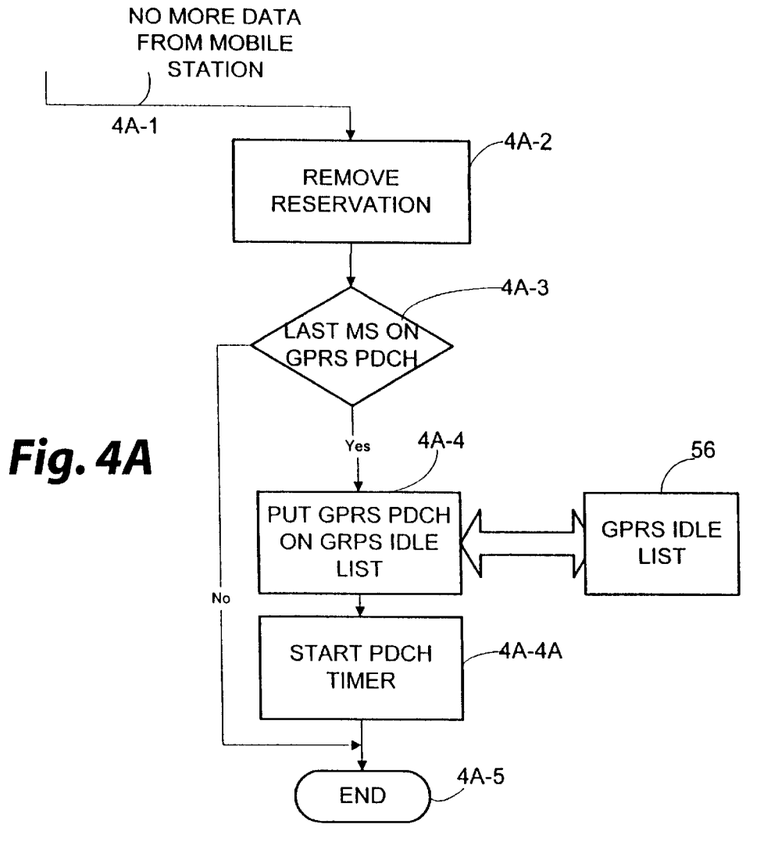
FIG. 4A is a flowchart showing basic steps performed in accordance with a procedure of putting channels on a GPRS Idle List according to a second mode of the invention.

FIG. 4A shows basic steps performed in accordance with a procedure of putting channels on a GPRS Idle List according to a second mode of the invention. The steps of FIG. 4A resemble those of the first mode as depicted in FIG. 4, with the further inclusion of step 4A—4A. In particular, at step 4A—4A a PDCH timer (in the bank of PDCH timers 58), which corresponds to the GPRS PDCH which was put on the GPRS Idle List 56 at step 4A-4, is started. As evident from FIG. 4B discussed below, the timer started at step 4A—4A serves to keep the GPRS PDCH which was put on the GPRS Idle List 56 at step 4A-4 allocated for a specified time period. After the specified time period, i.e., after the timer set at step 4A—4A times out, that particular GPRS PDCH is returned to the GSM Idle List unless the particular GPRS PDCH is again reserved for GPRS.

Figure 4B:
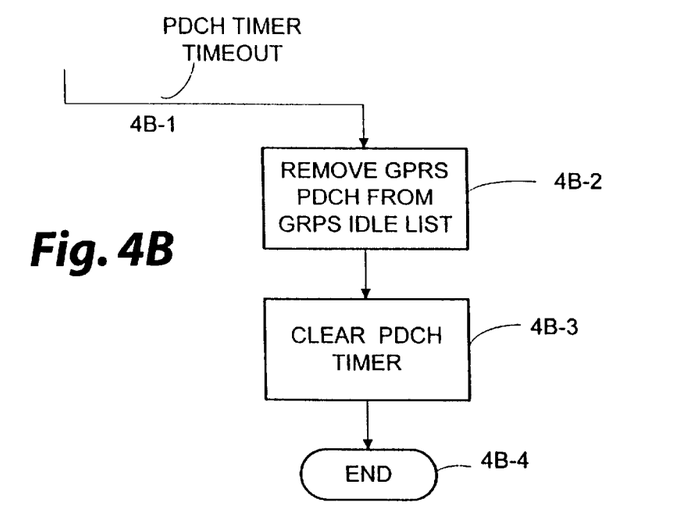
FIG. 4B is a flowchart showing basic steps performed in accordance with a procedure of removing channels from a GPRS Idle List according to the second mode of the invention.

FIG. 4B shows basic steps performed in accordance with a procedure of removing channels from a GPRS Idle List according to the second mode of the invention. The procedure of FIG. 4B is performed only if a dereserved GPRS PDCH on GPRS Idle List 56 has not been again reserved for GPRS use within the time period being timed by that PDCH's timer in the bank of PDCH timers 58, since further reservation of the GPRS PDCH stops and clears the timer associated therewith. When the timer started at step 4A—4A times out (e.g., reaches the specified time period), an interrupt is generated as shown by step 4B-1 in FIG. 4B. Upon generation of the interrupt of step 4B-1, the regional processor (RP) 54 performs step 4B-2 to remove the GPRS PDCH from GPRS Idle List 56. Then, as indicated by step 4B-3, the PDCH timer in the bank of PDCH timers 58 is cleared prior to ending (at step 4B-4) the routine of FIG. 4B.

Figure 4C:
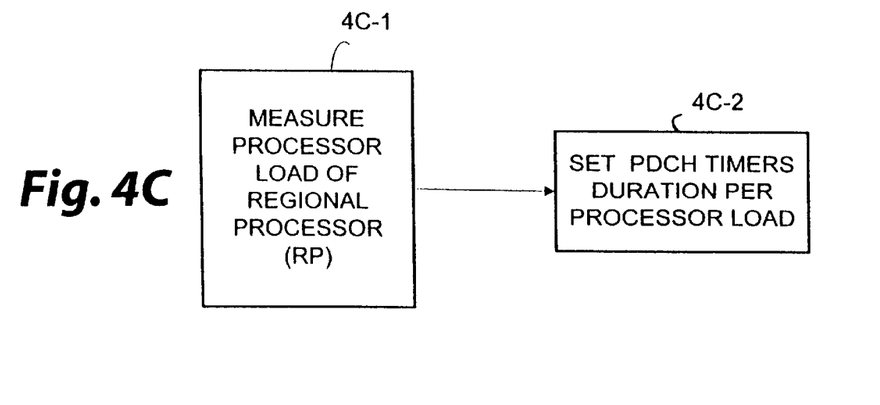
FIG. 4C, FIG. 4D, and FIG. 4E are flowcharts showing basic steps involved in dynamically setting timer duration for the second mode of the invention in accordance with generalized techniques of the invention.
Figure 4D:
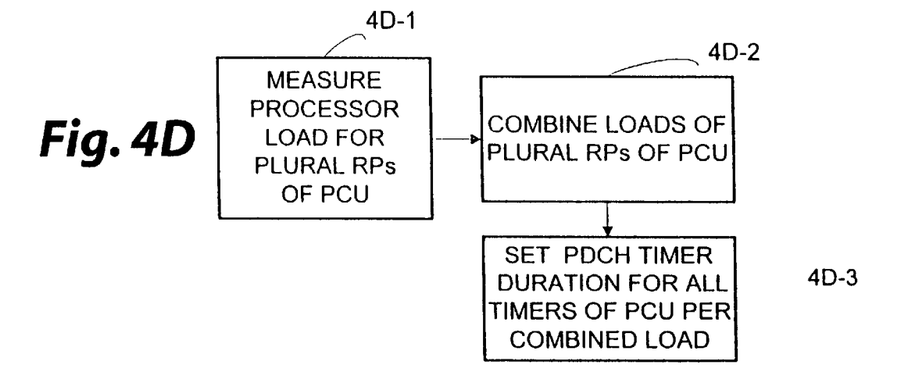
Figure 4E:
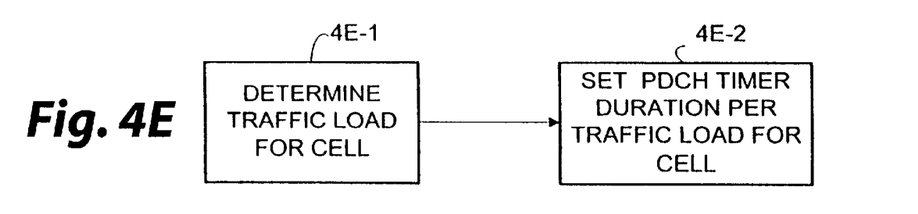

Also of importance to the second mode of the invention is the ability to configure dynamically the duration of the timers in the bank of PDCH timers 58, e.g., to dynamically adjust the specified period for timers in the bank of PDCH timers 58. FIG. 4C, FIG. 4D, and FIG. 4E illustrate three generalized techniques for dynamically controlling the duration of the timers in the bank of PDCH timers 58.

FIG. 4C shows basic steps involved in dynamically setting a timer duration for the second mode of the invention in accordance with a load function of a regional processor (RP) 54. At step 4C-1, the load function of the regional processor (RP) 54 is measured. As used herein, "load" and/or "load function" can mean: (1) CPU load of the regional processor (RP) 54; (2) the level of utilization of the GSL signaling devices for the regional processor (RP) 54; and/or (3) a combination of (1) and (2), and refers to the load originating from GPRS traffic. Then, at step 4C-2, the PDCH timer duration for all PDCH timers in bank 58 handled by the regional processor (RP) 54 is set in accordance with the processor load determined at step 4C-1.

FIG. 4D shows basic steps involved in dynamically setting a timer duration for he second mode of the invention in accordance with a load function of an entire packet control unit (PCU) 50. At step 4D-1, the load functions of plural regional processors (RPs) 54 comprising the CPU are measured. At step 4D-2, the load functions of the plural regional processors (RPs) 54 are combined. The combination can be, for example, a weighted combination, if desired. Then, at step 4D-2, the PDCH timer duration for all PDCH timers handled by the packet control unit (PCU) 50 is set in accordance with the combined load determined at step 4D-2.

In accordance with the foregoing techniques, a high value of the load function of will increase the probability for new reservations and this infers that a longer timer value shall be used for the GPRS Idle List, since a longer timer value will increase the probability of finding an idle activated channel. A low value of the processor load results in a shorter timer value. A shorter timer value allows flexible utilization of GSL devices by letting the channels return to the GSM Idle List when there has not been any GPRS traffic for the time determined by the timer value. Channels on the GSM Idle List are not GPRS activated, but are available again for both circuit switched (CS) traffic and GPRS traffic in any cell. A shorter timer value can also be used when the traffic varies considerably between cells. Thus, preferably a longer timer value is used at high load and a shorter timer value is used at low load.

FIG. 4E shows basic steps involved in dynamically setting a timer duration for the second mode of the invention in accordance with cell traffic load. In accordance with the FIG. 4E technique, for all PDCHs utilized by a certain cell, all those PDCHs have the same timer value based on traffic load in that certain cell. At step 4E-1, the traffic load for the certain cell is determined. Then, at step 4E-2, all PDCH timers in the cell are set to have a duration indicative of the traffic load of the cell.

Thus, the technique of FIG. 4E can be implemented one timer value per cell, with the timer value being regulated dynamically by the traffic load in that particular cell. As an illustrative example, the cell traffic load determination at step 4E-1 can be based on a count of the number of incoming TBFs, to each cell, over a given time interval. A TBF is a logical connection between the user equipment unit (UE) and the base station controller (BSC), i.e., at the RLC/MAC Protocol layer in GSM (see GSM 04.60 Specification). Each data transfer comprises one ore several TBFs. The TBF is thus a standardized concept with which the person skilled in the art is familiar. In the FIG. 4D technique, at high traffic a longer timer value is preferably used while at low traffic a shorter timer value is employed, as understood from the foregoing discussion of FIG. 4C.

Thus, considering all embodiments herein encompassed, the present invention provides a fast GPRS access by, upon deservation of a last mobile station using the GPRS PDCH, keeping the GPRS PDCH activated at base station (BS) 22 and keeping the GPRS signaling link (GSL) to packet control unit (PCU) 50 established. The non-reserved reserved but still-activated GPRS channels which are no longer utilized for GPRS traffic are put in GPRS Idle List 56. Thereby, when GPRS needs another channel, a channel from GPRS Idle List 56 is chosen first, in which case the channel activation procedure (illustrated, e.g., in FIG. 2B) had already been performed. This saves time, e.g., about 100 milliseconds, and provides GPRS users with fast access.

While base station controller (BSC) 24 has been illustrated as including group switch (GS) 80, it should also be understood that the present invention can be implemented with other types of switches and thus other types of data transmission, e.g., for example ATM switches.

The second embodiment of the invention, with its bank of PDCH timers 58, advantageously provides the GPRS user with fast access without causing any capacity problems in the PCU.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the principles of the invention are not confined to a GSM system, but instead are applicable to any telecommunications system wherein it is advantageous to maintain channels activated but not reserved for a particular service.

Furthermore, the second list, of which GPRS Idle List 56 is an example, need not necessarily be maintained at any particular node. While in the foregoing description GPRS Idle List 56 has been illustrated as included in packet control unit (PCU) 50, the person skilled in the art will realize that GPRS Idle List 56 could alternatively be provided at another node, such as base station controller (BSC) 24, for example.

In the embodiments described above, GPRS Idle List 56 has been particularly shown as maintained by PCU regional processor (RP) 54 of packet control unit (PCU) 50. Such location of GPRS Idle List 56 is just one implementation choice. Indeed, GPRS Idle List 56 could be provided in a processor other than a regional processor, such as PCU central processor (CP) 52, for example.

Placement of packet control unit (PCU) 50 may influence the amount of time saved in GPRS access. For example, if packet control unit (PCU) 50 is co-located with base station (BS) 22 rather than base station controller (BSC) 24, a smaller time saving may be realized. On the other hand, if packet control unit (PCU) 50 coexists with an SGSN, there may be a larger time saving even then when packet control unit (PCU) 50 coexists with base station controller (BSC) 24.

It will also be appreciated that a mobile station can request several PDCHs. For example, one mobile station may obtain several time slots (PDCHs), thereby obtaining a higher bandwidth.

What is claimed is:

1. A telecommunications system comprising a control node and a base station node, wherein the control node maintains a first list of idle radio channels which are available for a first type of telecommunications service, wherein the improvement comprises:

a second list of idle radio channels which are available for a specialized telecommunications service, the idle radio channels of the second list being radio channels which are unreserved with respect to the specialized telecommunications service but yet have an established transmission path and synchronization; wherein if, after dereservation of at least one of the idle radio channels on the second list and returning of the at least one of the idle radio channels to the second list, the at least one of the idle radio channels is not again reserved with respect to the specialized telecommunications service within a specified time period, the at least one of the idle radio channels returns to the first list.

2. The apparatus of claim 1, further comprising a timer which expires upon reaching the specified time period.

3. The apparatus of claim 1, further comprising a bank of timers, with the timers of the bank being paired with idle radio channels on the second list.

4. The apparatus of claim 1, wherein the specified time period is dynamically adjusted.

5. The apparatus of claim 1, wherein the second list is maintained by a processor having signaling devices, and wherein the specified time period is dynamically adjusted based on a load function.

6. The apparatus of claim 5, wherein the load function is a load function of a processor and includes one of (1) CPU load of the processor, and (2) extent of utilization of signaling devices of the processor.

7. The apparatus of claim 1, wherein the specified time period is dynamically adjusted based on traffic load of a cell served by the at least one of the one idle radio channels on the second list.

8. The apparatus of claim 1, wherein the specialized telecommunications service involves packet data transfer.

9. The apparatus of claim 1, wherein the first type of telecommunications service is a circuit switched service.

10. The apparatus of claim 1, wherein control node is a base station controller, and wherein the second list is maintained at a packet control node which is co-located with the base station controller.

11. The apparatus of claim 10, wherein the second list is maintained by a processor of the packet control node.

12. The apparatus of claim 11, wherein the second list is maintained by a regional processor of the packet control node.

13. The apparatus of claim 1, wherein the telecommunications system further comprises a base station control node, and wherein a signaling link and transmission path through the base station control node exists for the idle radio channels of the second list.

14. A method of operating a telecommunications system comprising a control node and a base station node, the method comprising:

(1) maintaining a first list of idle radio channels which are available for a first type of telecommunications service;

(2) maintaining a second list of idle radio channels which are available for a specialized telecommunications service, the idle radio channels of the second list being radio channels which are unreserved with respect to the specialized telecommunications service but yet activated at the base station node;

(3) responding to a request for a radio channel for use by the specialized service by reserving a radio channel from the second list;

(4) after dereservation of the radio channel reserved at step (3), returning the dereserved idle radio channel to the second list; and (5) returning the dereserved idle radio channel to the first list upon expiration of a specified time period if the dereserved idle radio channel is not again reserved within the specified time period.

15. The method of claim 14, further comprising the step of using a timer to determine expiration of the specified time period.

16. The method of claim 14, further comprising using a bank of timers, with the timers of the bank being paired with idle radio channels on the second list.

17. The method of claim 14, further comprising dynamically adjusting the specified time period.

18. The method of claim 14, further comprising using a processor having signaling devices to maintain the second list, and further comprising dynamically adjusting the specified time period based on a load function.

19. The method of claim 18, wherein the load function is a load function of a processor and includes one of (1) CPU load of the processor, and (2) extent of utilization of signaling devices of the processor.

20. The method of claim 14, further comprising dynamically adjusting the specified time period based on traffic load of a cell served by the at least one of the one idle radio channels on the second list.

21. The method of claim 14, wherein the specialized telecommunications service involves packet data transfer.

22. The method of claim 14, wherein the first telecommunications service is a circuit switched service.

23. The method of claim 14, further comprising maintaining a signaling link and transmission path through a base station control node for the idle radio channels of the second list after the idle radio channels of the second list is unreserved.

24. The method of claim 14, wherein when the second list is devoid of any idle radio channels, the method further comprises the specialized telecommunications service obtaining an allocated channel from the first list, whereupon the control node activates the allocated channel obtained from the first list.

25. The method of claim 14, further comprising using a processor of a packet control node to maintain the second list.

26. The method of claim 24, further comprising using a regional processor of the packet control node to maintain the second list.

27. The method of claim 14, further comprising
responding to a request for a radio channel for use by the first type of telecommunications service by choosing a radio channel from the first list, and if the first list is empty releasing a radio channel from the second list and choosing the released radio channel.

* * * * *